Reissued Feb. 4, 1941 Re. 21,703

UNITED STATES PATENT OFFICE 21,703

PROCESS OF MAKING ALKALI SUBSILICATES

Clarence W. Burkhart, Lansdowne, Pa., and Walter S. Riggs, Haddon Heights, N. J., assignors to Pennsylvania Salt Manufacturing Company, Philadelphia, Pa., a corporation of Pennsylvania No Drawing. Original No. 2,083,545, dated June 15, 1937, Serial No. 15,722, April 10, 1935. Application for reissue August 10, 1940, Serial No. 352,176

19 Claims. (Cl. 23—110)

Our invention relates to a novel process of manufacturing soluble alkali silicates, and more particularly it relates to an economic process for the production of alkali silicates, of an alkali content not less than the silica content, by the direct reaction of caustic alkali and silica without dissolution of the caustic alkali or the fusion thereof.

One object of the present invention is to provide a method by which the various soluble alkali silicates may be easily and economically manufactured without resort to the expensive equipment and laborious steps required in either the wet digestion or the fusion process previously employed in the production of these compounds.

A further object of the invention is to furnish a process of making alkali subsilicates by the reaction of solid caustic alkali with powdered silica, in contradistinction to the previous processes where the reaction is carried out either in solution or by fusion.

Still another object is to provide a process by which granular or pulverulent soluble alkali silicates may be obtained in a free-flowing marketable form without the necessity of expending energy and time in grinding or comminuting the product to useful size.

A still further object is to provide a process for the manufacture of high grade, free-flowing, stable alkali silicates of low hydration and of any desired ratio of alkali to silica from one to one upwards; for example, the metasilicate, the sesquisilicate, the orthosilicate, or mixtures thereof, as contrasted with the variety of silicate products now available on the market that contain large and varying percentages of water of crystallization.

Other objects will be apparent from a consideration of the specification and claims.

The processes heretofore employed in the production of alkali silicates, whose alkali content is not less than the silica content, known, and referred to herein, as alkali subsilicates, have been time-consuming, laborious, and expensive, and have required the use of expensive equipment. The subsilicates have previously been manufactured by fusion methods or by wet digestion methods or a combination of the two.

In the fusion method, an alkali carbonate and silica are heated together to high temperatures substantially above the fusion point of the system, and the fused product after cooling is dissolved in water and corrected to the proper alkali-silica ratio. It is then necessary to concentrate the solution, remove the silicates therefrom by crystallization, comminute, and dry the crystals. In such a process, the plant and equipment are costly, the repair charges are high due to slagging effect on the furnace linings, and the fuel consumed is expensive.

In the wet digestion method, silica or water-glass is rendered soluble by digestion with a concentrated solution of caustic alkali, and the solution is evaporated and cooled to a suitable crystallization temperature. It is then seeded, agitated, and cooled to remove therefrom the heat generated by the crystallization. The crystals are removed, comminuted, and dried. If water-glass is employed, it is obtained by fusing silica with an alkaline carbonate, or an alkali sulphate and carbon, followed by a special extraction process to render the silicate soluble. It is obvious that in this process, the evaporation costs are high, the layout of the plant is extensive, and the necessary digester equipment is expensive.

The process of the present invention departs markedly from the previous processes since neither fusion nor wet digestion is involved. In accordance with the process of the invention, solid caustic alkali and finely divided silica are reacted directly by mixing at a temperature below the melting point of the caustic alkali. The reaction may be carried out in a simple apparatus, such as a suitable externally-heated mixing device, to insure agitation of the mass during the reaction. The product from the mixer is available for use in the trade and contains water corresponding substantially to the monohydrate. A product of improved appearance and of very low hydration may be obtained by a so-called "dressing" process in which the product from the mixer is heated at a somewhat elevated temperature but below the melting point of the silicate. This product is designated herein as a technically anhydrous material, although it may contain a fraction of one molecule of water of crystallization. The process in the mixer can be completed in less than fifteen minutes and the total time required in producing the technically anhydrous product may be less than one hour.

It will be seen that the process of the present invention eliminates the difficulties and expense of both the wet digestion and fusion methods previously employed in the manufacture of alkali subsilicates. The present process avoids the multiple adjustments and readjustments of composition, hydration, and concentration, as well as the seeding, crystallization, separation of the crystals, and drying required in the wet digestion method. By the use of ordinary non-specialized equipment, the process also obviates the need of the special fusion furnaces of complicated construction, of the high temperature rotating reaction vessels provided with special mechanical agitators, and of the special linings required by the fusion process.

The process of the present invention is applicable for the production of alkali silicates corresponding to any desired ratio of alkali to silica where the alkali oxide content is equal to or greater than the silicon dioxide content. For example, a silicate corresponding to the metasilicate, the sesquisilicate, the orthosilicate, or mixtures thereof, may be formed by mixing the desired ratio of ingredients.

If the ratio of $Na_2O$ to $SiO_2$ is 2 to 1, a silicate is formed, after the reaction in the mixer, which is from 99% to 100% soluble. The ratio of the two oxides in the compound corresponds to the orthosilicate and a substantially pure technically anhydrous orthosilicate ($Na_4SiO_4$) is obtained when the product of the mixer is subjected to the dressing step. When the ratio of $Na_2O$ to $SiO_2$ is 1.5 to 1, a compound is formed in the mixer in which the ratio of $Na_2O$ to $SiO_2$ corresponds to the sesquisilicate. After dressing, a technically anhydrous sesquisilicate ($Na_6Si_2O_7$) is obtained. If a compound in which the ratio of alkali oxide to silicon dioxide approaches the metasilicate is desired, 1.25 parts of $Na_2O$ are mixed with 1 part of $SiO_2$ and reacted in the mixer as described. This product may then be further heated to produce a technically anhydrous product. It will also be clear that if other ratios of alkali oxide to silicon dioxide are desired, the amounts of materials added to the mixer may be adjusted accordingly. Thus mixtures of the various silicates may be obtained. It will be obvious that other caustic alkalis, for example caustic potash, may be substituted in equivalent amounts for the caustic soda specified.

The caustic alkali (sodium hydroxide or potassium hydroxide) may be added to the mixer either in a ground or flake condition. The silica may be of any desired purity and of any suitable fineness to promote the reaction, and may be either an anhydrous or a hydrated silicon dioxide. The natural amorphous forms such as opal and diatomaceous earth or the natural crystalline forms, such as rock crystal, sand, flint, sandstone, or any other variety of quartz can be used. By-product amorphous or crystalline forms of silica, hydrated or otherwise, are also suitable sources of silica. Since in general a high purity product is desired, a relatively pure silica will be used, but if the purity of the finished silicate is not a requisite, impure silica may be used, provided that the impurities do not react at the temperature and under the conditions of the reaction to form insoluble silicates.

As previously stated, the reaction takes place between the solid caustic soda and the powdered silica. The reaction proceeds satisfactorily by dry mixing the ingredients. In order to promote the reaction, lubricate the mixture, and protect the apparatus, a small amount of water may be added either to the caustic alkali or the silica. In no case, the amount of water added is sufficient to dissolve the alkali used. If water is added, it will in general not exceed 7% of the total weight of the silica and caustic alkali.

The mixing device in which the reaction between the caustic alkali and silica is brought about is preferably externally heated to a point where the reaction is sufficiently exothermic to cause completion thereof in a relatively short time. The temperature of the reaction depends on the nature of the silica material. For example, with properly activated silica, the reaction will take place at room temperature. A temperature of the reacting ingredients of about 175° C. or higher will bring about the reaction with naturally occurring silica in a very short time although lower temperatures may be employed. When a temperature of 175° C. is employed in the reacting mass, the temperature rises to 200° C.–210° C., due to the heat liberated by the reaction. Temperatures higher than this may be employed if desired, as long as the point of fusion of caustic alkali is not reached. In general, the temperature of the mixture of materials employed will be between 175° C. and 250° C.

As previously pointed out, the mixture of the caustic alkali and the silica particles is preferably agitated during the heating. The mass, due to the reaction, is converted into a viscous flowable material, which in a very short time becomes a plastic mass. When the temperature is reached where the reaction becomes noticeably exothermic, the water added, if any, is liberated as steam. The plastic mass soon solidifies, and due to the mechanical action of the mixer, a granular or pulverulent free-flowing product is obtained. The product is suitable for use by the trade and corresponds substantially to a silicate monohydrate, containing an amount of free caustic alkali, depending on the ratio of materials used.

If desired, in order to improve the appearance and quality of the product, the granular material of the mixer may be dressed by further heating it as a somewhat higher temperature, care being taken not to approach the melting point of the product. Usually, a temperature between 300° C. and 600° C. will be employed and excellent results are obtained when a temperature in the neighborhood of 450° C. is used. A rotary drier heated indirectly by any suitable source of fuel is applicable for this treatment and a carbon-dioxide-free atmosphere may be maintained therein if an especially pure product is desired. A technically anhydrous free-flowing, white granular or powdered product is obtained after the heat-treatment in, for example, thirty to sixty minutes.

In a typical case, 60 parts of very finely divided silica, 100 parts of powdered caustic soda, and, if desirable, 10 parts of water are placed in a mixer fitted with a stirring device, and heated. Within a few minutes, for example six minutes, when the mixer is at an elevated temperature when the materials are placed therein, the mixture reaches a temperature of about 175° C. and becomes a viscous flowable mass; in a further two to two and one-half minutes, a vigorous reaction takes place, the temperature rises to 200° C. to 225° C. and especially in the case when water has been added, an evolution of steam takes place and a plastic material is formed. In about a further minute of time, the material commences to change from a plastic to a granular condition and this change is completed in from one and one-half to two minutes. The product is characterized by good scouring, detergent, and abrasive properties; can be used by the trade; approaches a metasilicate in composition; and contains less than 5% unreacted $SiO_2$ and less than 15% unreacted NaOH.

If a technically anhydrous product is desired, the product from the mixer is placed in a drier at approximately 450° C. for about forty-five minutes. A completely soluble product is obtained which consists substantially of equal parts of metasilicate and sesquisilicate.

If a higher purity metasilicate is desired, the dressed product from the drier is treated with the necessary amount of water-glass of suitable composition to bring the ratio of alkali oxide to silica to that corresponding to a metasilicate. The treatment with the water-glass is preferably carried out in a blending mixer in order to insure thorough mixing. The granular product may be marketed for technical uses, or passed through a drier heated to a temperature in the neighborhood of 200° C. The fine free-flowing product obtained is of high purity and corresponds substantially to the formula $Na_2SiO_3$ and as such is suitable for all industrial uses.

If 60 parts of silica are treated with 123 parts of caustic soda in place of the proportion in the example previously given, the product formed approaches a sesquisilicate. The product may be marketed as such or may be subjected to a dressing step corresponding to that previously described, in which case a sesquisilicate of high purity and solubility is obtained.

A metasilicate can be formed, if desired, from the technically anhydrous sesquisilicate by the addition, preferably in a blending mixer, of the necessary amount of commercial water-glass to bring the ratio of alkali oxide to silica to that corresponding to the metasilicate. The product is preferably treated by passing it rapidly through a drier at a temperature in the neighborhood of 200° C., and a fine, free-flowing product is obtained, corresponding substantially to that of technically anhydrous metasilicate and which is suitable for all uses.

If 60 parts of silica and 165 parts of caustic soda are reacted in the mixer under the conditions of the first specific example, a product approaching an orthosilicate in composition is formed. This product is stable, free-flowing, and practically totally soluble, and can be used commercially. In order to obtain a technically anhydrous sodium orthosilicate, the product of the mixer is heated in a suitable drier as described at temperatures from 300° C. to 600° C., preferably in the neighborhood of 450° C. The product is also free-flowing and available for all technical uses.

If the silicates produced in accordance with the process of the reaction are to be used as detergents, it may be desirable to incorporate other materials possessing somewhat similar properties with the silicates, for example, trisodium phosphate, disodium phosphate, sodium carbonate, and sodium bicarbonate. The materials may be incorporated with the silicates at any desired point in the process, depending upon the nature and chemical properties of the materials included.

While in this specification, there is described a process of converting a subsilicate of higher ratio of alkali oxide to silicon dioxide to one of a lower ratio by reaction of the subsilicate with a compound of the type of water glass, no claims directed to this process are made herein, since such invention is described and claimed in our co-pending application Serial No. 131,748, filed March 18, 1937, as a continuation-in-part hereof (now Patent No. 2,175,781).

Considerable modification is possible in the proportions of reactive silica material and caustic alkali employed, as well as in the physical factors used in the various steps of the process without departing from the essential features of the invention.

We claim:

1. The process of preparing a solid alkali subsilicate, which comprises mixing together powdered silica and solid subdivided caustic alkali, in such molecular proportions that the alkali oxide content of the mixture is not less than the silicon dioxide content, and in the absence of water exceeding 7% of the total weight of the silica and caustic alkali; and heating the mixture to a temperature below the fusion point of said caustic alkali sufficient to cause a vigorous reaction between the silica and caustic alkali and the liberation of sufficient water to form in a short time a subsilicate, the water content of which does not substantially exceed that of a monohydrate.

2. The process of preparing a solid alkali subsilicate, which comprises mixing together powdered relatively non-reactive silica and solid subdivided caustic alkali, in such molecular proportions that the alkali oxide content of the mixture is greater than the silicon dioxide content, and in the absence of water exceeding 7% of the total weight of the silica and caustic alkali; and heating the mixture to a temperature below the fusion point of said caustic alkali, while stirring, sufficient to cause a vigorous reaction between the silica and caustic alkali and the liberation of sufficient water to form in a short time a subsilicate, the water content of which does not substantially exceed that of a monohydrate.

3. The process of claim 2 wherein the caustic alkali is caustic soda and the silica is naturally-occurring, substantially pure silica, and wherein the temperature is above about 175° C.

4. The process of preparing a solid alkali subsilicate, which comprises mixing together powdered relatively non-reactive silica and solid subdivided caustic alkali, in such molecular proportions that the alkali oxide content of the mixture is greater than the silicon dioxide content, and in the absence of an appreciable amount of water; and heating the mixture to a temperature below the fusion point of said caustic alkali, while stirring, sufficient to cause a vigorous reaction between the silica and the caustic alkali and the liberation of sufficient water to form in a short time a subsilicate, the water content of which does not substantially exceed that of a monohydrate.

5. The process of claim 4 wherein the caustic alkali is caustic soda and the silica is naturally-occurring, substantially pure silica, and wherein the temperature is above about 175° C.

6. The process of preparing a solid alkali subsilicate, which comprises mixing together powdered relatively non-reactive silica and solid subdivided caustic alkali, in such molecular proportions that the alkali oxide content of the mixture is greater than the silicon dioxide content, and in the absence of water; and heating the mixture to a temperature below the fusion point of said caustic alkali, while stirring, sufficient to cause a vigorous reaction between the silica and caustic alkali to form in a short time a subsilicate.

7. The process of claim 6 wherein the caustic alkali is caustic soda and the silica is naturally-occurring, substantially pure silica, and wherein the temperature is above about 175° C.

8. The process of preparing a solid sodium subsilicate, which comprises mixing together powdered, naturally-occurring, substantially pure silica and solid subdivided caustic soda, in such molecular proportions that the $Na_2O$ content of the mixture is greater than the $SiO_2$ content, and in the absence of water exceeding 7% of the total weight of the silica and caustic soda; heating the mixture to a temperature below the fusion point of caustic soda sufficient to cause a vigorous reaction between the silica and caustic soda and the liberation of sufficient water to form in a short time a subsilicate, the water content of which does not substantially exceed that of a monohydrate; and during said reaction stirring the mass until a solid granular product is obtained.

9. The process of preparing a solid sodium subsilicate, which comprises mixing together powdered naturally-occurring, substantially pure silica and solid subdivided caustic soda, in such molecular proportions that the $Na_2O$ content of the mixture is greater than the $SiO_2$ content, and in the absence of an appreciable amount of water; heating the mixture to a temperature above about 175° C. and below the fusion point of caustic soda sufficient to cause a vigorous reaction between the caustic soda and silica and the liberation of sufficient water to form in a short time a subsilicate, the water content of which does not substantially exceed that of a monohydrate; and during said reaction stirring the mass until a solid granular product is obtained.

10. The process of preparing a solid sodium subsilicate, which comprises mixing together powdered naturally-occurring, substantially pure silica and solid subdivided caustic soda, in such molecular proportions that the $Na_2O$ content of the mixture is greater than the $SiO_2$ content, and in the absence of water; heating the mixture above about 175° C. and to a temperature below the fusion point of caustic soda sufficient to cause a vigorous reaction between the caustic soda and silica to form in a short time a subsilicate; and during said reaction stirring the mass until a solid granular product is obtained.

11. The process of preparing a solid technically anhydrous sodium subsilicate, which comprises mixing together powdered silica and solid subdivided caustic soda, in such molecular proportions that the $Na_2O$ content of the mixture is greater than the $SiO_2$ content, and in the absense of water exceeding 7% of the total weight of the silica and caustic soda; heating the mixture to a temperature below the fusion point of caustic soda, while stirring, sufficient to cause a vigorous reaction between the caustic soda and silica and the liberation of sufficient water to form in a short time a subsilicate, the water content of which does not substantially exceed that of a monohydrate; and thereafter further heating the product at a temperature above 300° and below the melting point thereof to cause a further reaction and the conversion of the product into the technically anhydrous true subsilicate product.

12. The process of preparing a solid technically anhydrous sodium sub-silicate, which comprises mixing together powdered naturally-occurring, substantially pure silica and solid subdivided caustic soda, in such molecular proportions that the $Na_2O$ content of the mixture is greater than the $SiO_2$ content, and in the absence of an appreciable amount of water: heating the mixture to a temperature above about 175° C. and below the fusion point of caustic soda, while stirring, sufficient to cause a vigorous reaction between the caustic soda and silica and the liberation of sufficient water to form in a short time a subsilicate, the water content of which does not substantially exceed that of a monohydrate; and thereafter further heating the product at a temperature above 300° C. and below the melting point thereof to cause a further reaction and the conversion of the product into the technically anhydrous true subsilicate product.

13. The process of claim 12 wherein the ratio of $Na_2O$ to $SiO_2$ is approximately 1.5 to 1 and wherein the product formed is substantially $Na_6Si_2O_7$.

14. The process of claim 12 wherein the ratio of $Na_2O$ to $SiO_2$ is approximately 2 to 1 and wherein the product formed is substantially $Na_4SiO_4$.

15. The process of preparing a solid technically anhydrous sodium subsilicate, which comprises mixing together powdered naturally-occurring, substantially pure silica and solid subdivided caustic soda, in such molecular proportions that the $Na_2O$ content of the mixture is greater than the $SiO_2$ content, and in the absence of water; heating the mixture to a temperature above about 175° C. and below the fusion point of caustic soda, while stirring, sufficient to cause a vigorous reaction between the caustic soda and silica to form in a short time a subsilicate; and thereafter further heating the product at a temperature above 300° C. and below the melting point thereof to cause a further reaction and the conversion of the product into the technically anhydrous true subsilicate product.

16. The process of claim 15 wherein the ratio of $Na_2O$ to $SiO_2$ is approximately 1.5 to 1 and wherein the product formed is substantially $Na_6Si_2O_7$.

17. The process of claim 15 wherein the ratio of $Na_2O$ to $SiO_2$ is approximately 2 to 1 and wherein the product formed is substantially $Na_4Si_2O_4$.

18. The process of preparing a solid technically anhydrous sodium subsilicate, which comprises mixing together powdered, naturally-occurring, substantially pure silica and solid subdivided caustic soda, in such molecular proportions that the $Na_2O$ content of the mixture is greater than the $SiO_2$ content, and in the absence of water exceeding 7% of the total weight of the silica and caustic soda; heating the mixture to a temperature below the fusion point of caustic soda sufficient to cause a vigorous reaction between the silica and caustic soda and the liberation of sufficient water to form in a short time a subsilicate, the water content of which does not substantially exceed that of a monohydrate; during said reaction stirring the mass until a solid granular product is obtained; and thereafter further heating the product at a temperature above 300° C. and below the melting point thereof to cause a further reaction and the conversion of the product into the technically anhydrous true sub-silicate product.

19. The process of claim 2 wherein the temperature is above about 175° C.

CLARENCE W. BURKHART.
WALTER S. RIGGS.

CERTIFICATE OF CORRECTION.

Reissue No. 21,703. February 4, 1941.

CLARENCE W. BURKHART, ET AL.

It is hereby certified that error appears in the printed specification of the above numbered patent requiring correction as follows: Page 2, second column, line 39, for "as" read --at--; page 4, first column, line 40, claim 10, for the words "above about 175° C. and to a temperature" read --to a temperature above about 175° C. and--; same page, second column, line 46, claim 17, for "$Na_4Si_2O_4$" read --$Na_4SiO_4$--; and that the said Letters Patent should be read with this correction therein that the same may conform to the record of the case in the Patent Office.

Signed and sealed this 18th day of March, A. D. 1941.

Henry Van Arsdale,
Acting Commissioner of Patents.

(Seal)